D. H. Thompson,
Boring Blind Stiles.
Nº 8,931.  Patented May 4, 1852.
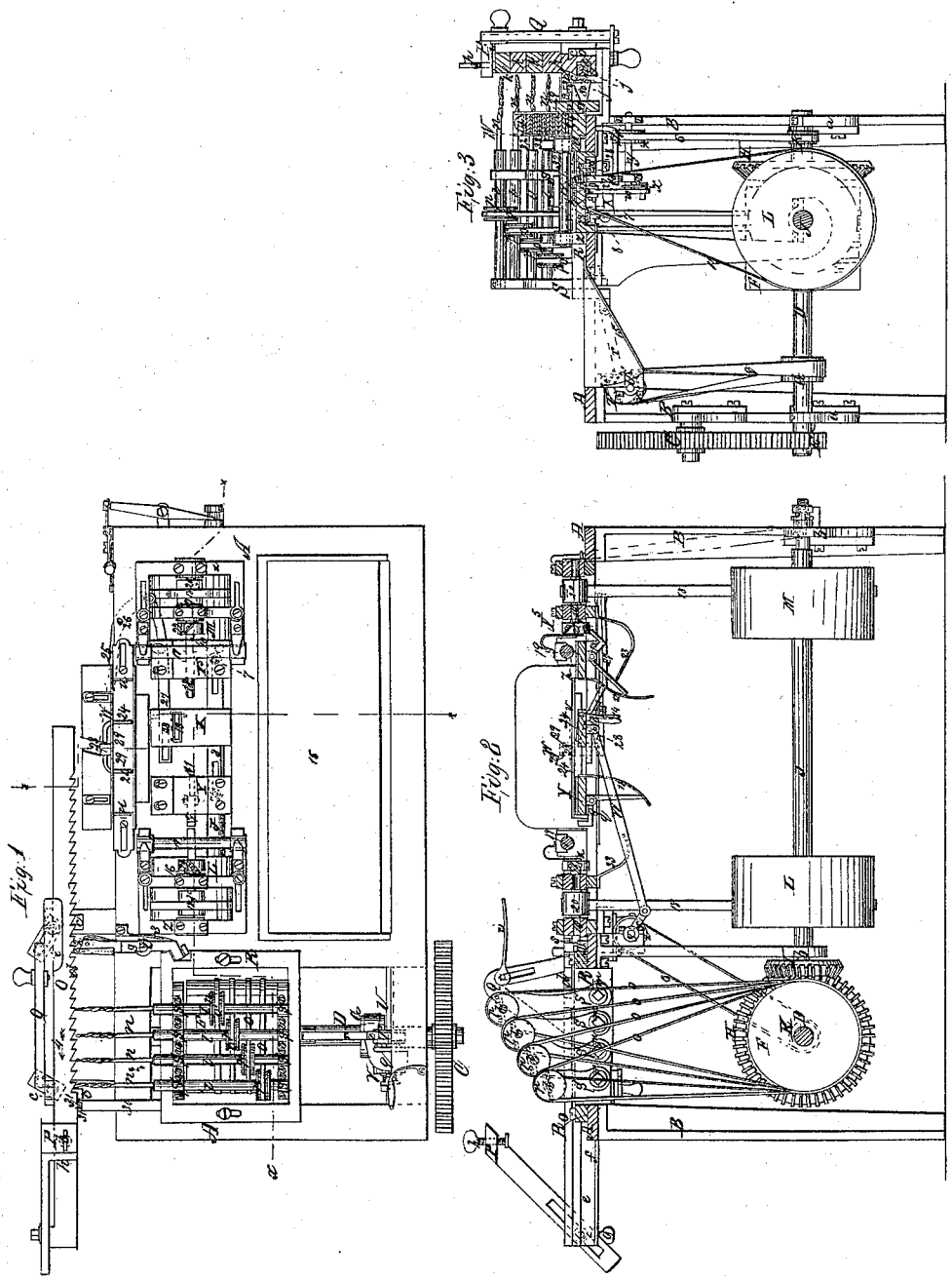

UNITED STATES PATENT OFFICE.

DANL. H. THOMPSON, OF SPRINGFIELD, MASSACHUSETTS.

WINDOW-BLIND MACHINERY.

Specification of Letters Patent No. 8,931, dated May 4, 1852.

*To all whom it may concern:*

Be it known that I, Daniel H. Thompson, of Springfield, in the county of Hampden and State of Massachusetts, have invented certain new and useful Improvements in Machinery for Manufacturing Blinds; and I do hereby declare that the following is a full, clear, and exact description of the same, reference being had to the accompanying drawings of the same, forming part of this specification, in which—

Figure 1, is a plan. Fig. 2, is a longitudinal vertical section, taken about in the line ˣ, ˣ, shown in Fig. 1. Fig. 3, is a transverse vertical section, taken about in the line *, *, shown in Fig. 1.

Similar letters and figures of reference indicate corresponding parts in each of the several figures.

This invention relates to certain means by which the stiles are bored to receive the tenons or pivots of the slats, the rods and slats are pricked to receive the wires, and the tenons or pivots are turned on the slats, at one and the same time; the several parts above named of a single pair or of a number of pairs of blinds being placed in the machine and properly adjusted have the several operations performed upon them without further manipulation.

To enable those skilled in the art to make and use my invention I will proceed to describe its construction and operation.

A, A, is a bed plate, supported upon standards B, B, and carrying the operating parts of the machine.

C, is the driving wheel which is hung on a suitable axle and receives rotary motion by any suitable means.

D, is a shaft extending across the machine, being hung in suitable bearings $a$, $a$, it receives motion through a pinion E, from the driving wheel C, and carries a pulley F, for giving rotary motion to the boring augers, a pulley G, for driving the shaft by which the augers are moved back and forth, a pulley K, for driving the bed which carries the slats, and a bevel wheel H, which gears with another bevel wheel I, on a shaft J, which is hung in bearings $b$, $b$, at right angles to the shaft D. The shaft J, carries two pulleys L and M, which drive the cutters for turning down the tenons on the slats.

O, is a sliding bar or carriage fitted between guides $c$, $c$, secured to the bed plate and held so as to be only capable of moving in a line parallel longitudinally to the machine; it is provided on its inner side with a ratchet $d$, and has a recess $e$, see Figs. 2, and 3, extending its whole length which receives the blind rods $j$, $j$, to be pricked, the rods being secured in the recess by springs $f$, and a set screw $g$,—the position of the rods is shown in red in Fig. 3, which exhibits them in transverse section. The bar O, carries the stiles $k$, $k$, they are laid one above another on the top of the bar as shown in red in transverse section in Fig. 3, and secured by an adjustable clamp P, and set screw $h$, being also held down by a spring $i$, which is secured to a standard Q, which is attached to the guide $c$, $c$, or to the side of the bed plate.

R, is the auger carriage which is fitted to the bed plate in such a manner as to be allowed a reciprocating motion across the frame. The auger shafts $l$, $l$, carrying boring augers $n$, $n$, are hung in swinging arms or gates S, S, of different lengths, which are hung on screw pivots $m$, $m$, secured in the carriage R; the pivots $m$, $m$, being in one horizontal line and the gates or arms S, S, of different lengths, the shafts are held at different heights. The length of the several gates or arms is such as to keep the shafts at equal distances vertically from each other, and their width being the same where the bearings for the shafts are, as the distance between the pivots $m$, $m$, the shafts will all be at the same distance apart horizontally when the gates are close together; but as the gates or bars are moved from a vertical position the vertical distance between the shafts will be reduced, and vice versa, the distances between them still being equal.

By the above means the augers are adjusted for stiles of different depths or thicknesses. The auger shafts receive their rotary motion through bands $o$, $o$, running from the pulley F, over the pulleys $p$, $p$, on the said shafts. The carriage R, receives its reciprocating motion for the purpose of impelling the augers into their work and withdrawing them from it, by means of an eccentric T, on a shaft U, which is driven by a band $q$, running from the pulley G, to its pulley V, the carriage being connected to the eccentric by a rod $r$. Near the carriage R, on the bed plate there is a lever $s$, working on a fixed fulcrum $t$; one end of this lever is bent and provided with an adjustable bearing screw 1, which bears on the sloping side of a recess formed in the side of the carriage R, and the other end carries a spring pawl or catch 2, which takes into the ratchet $d$; a spring 3, is applied to the lever to keep it bearing on the carriage, and every movement of the carriage R, vibrates the lever and causes the spring pawl to move over a tooth of the ratchet, and move the bar or carriage O, in the direction of the arrow 4, shown in Fig. 1. To the front of the carriage R, is secured a rigid rod 30, which carries two or more pairs of pins or prickers 31, 31, which make the necessary holes in the blind rods to receive the wires which attach the slats.

W, is a stationary box secured to the bed plate to hold the slats to be operated upon; its ends $u$, $u$, and one side are adjustable to different lengths and widths of slats; the slats 32, 32, which are shown in it in transverse section in Fig. 3, are placed in from the top. At the bottom of the box on the front side there is an opening $v$, through which the slats are passed from it to the bed or table, upon which they are carried to the tenoning mechanism. This table is formed in three parts, X, Y, and $Y^5$, all fitting in a similar manner between rabbets in the bed plate so as to be capable of a reciprocating motion longitudinally in the machine. The middle part X, is connected by a pitman $w$, to a crank $x$, on a transverse shaft $y$, which receives rotary motion by a band 6, running from the pulley K, over its own pulley L,— by these means X, receives a reciprocating motion. The parts Y, and $Y^5$ are connected to X, by set screws 7, 7, which pass through slots in a rod 8, attached to the under side of X, the said set screws confining the rod to the parts Y, $Y^5$, but allowing them to be adjusted at different distances from X. Under Y and $Y^5$, are attached dogs 9, and 10, which work on pivots and project beyond and above the ends of the table, having springs 11, and 12, applied to them to keep them in operation; these dogs are for the purpose of confining the slat endwise.

The object of making Y, and $Y^5$, adjustable in relation to X, is to accommodate different lengths of slats. X, is provided with a tipper 13, consisting of a small bent lever hung on a pin or fulcrum in a slot made through the table. One arm of this tipper hangs downward and the other when free lies nearly horizontal just below the surface of the table under one edge of the slat which is placed on it. A bar 14, stationary below the bed plate is so placed as to catch the lower arm at the proper moment, as the table reciprocates, and throw up the upper arm and make it tip over the slat and throw it off the table on to an inclined slide or chute 15.

Z, Z′, are the cutter heads which carry the tenoning cutter shafts; they are secured to the bed plate but are adjustable longitudinally so as to operate on slats of different lengths. The tenoning cutter shafts 16, 17, are hung in suitable bearings in the heads, and receive rotary motion through bands 18, 18, running from the pulleys L, M, over their own pulleys 20, 20. The cutter blocks 21, 22, and their cutters are of a form commonly used for turning down cylindrical pivots or tenons, being simply disks with face cutters, and an opening in the center between the cutters of the required diameter of the pivot or tenon; they are placed on the ends of the shafts opposite or facing each other. In front of each cutter block, there is a pressure roller 19, which is hung in bearings in the cutter head and exerts a pressure upon the slat to hold it down on the table or bed as the tenon or pivot is being formed; and under each is a catch 33, for releasing the dog 9 or 10, on the slat table while the tenon is being cut.

23, is a feeder for feeding the slats in succession to the table X, Y, $Y^5$, it consists of a small head carrying two horns 24, 24, and is attached to a lever 25, having its fulcrum on a pin 26, in the bed plate. The opposite end of the lever to that carrying the feeder, is attached to a rod 27, this rod passes under the reciprocating table X, Y, $Y^5$, and is provided with a slot which fits easily on a pin or screw 28, in the part X, of the table; the slot being shorter than the travel of the table the pin 28, strikes its ends and moves it so as to vibrate the lever 25; every vibration of the lever throws the head 23, up to the side of the slat box and causes the horns 24, 24, to pass through two openings provided for them in the side of the box, and push out the lowest slat through the opening $v$, to the table. In the upper part of the head 23, there are two pins or prickers 29, 29, which pass through holes in the side of the box, and make the necessary holes in one of the slats to receive the wire, which attaches it to the rod.

The several parts of the machinery are adjusted, the parts of the blinds to be operated upon are inserted, and the operation is conducted in the following manner:

The stiles are first placed on the sliding bar or carriage O, and secured in place by the set screw $h$. The gates or swinging arms S, S, are then brought to such a position as to bring all the augers to the required distances apart to suit the thickness of the stiles; they may then be secured in position by any simple means as by tightening up their screws or placing a rest under them. The rods are next placed in the recess $e$, in the bar or carriage O, and the slats are placed in the box W; the ends of the box are then adjusted to meet the ends of the slats. The parts Y, $Y^5$, of the reciprocating table or bed are then adjusted so as to bring the dogs 9, and 10, at the proper distance apart to hold the slats and the cutter heads Z, Z, are brought to and secured in a position suitable for cutting the tenons on the slats as they are presented to each successively—everything is now ready for operation.

Rotary motion is given to the driving wheel C, by any suitable means, and by it transmitted to the wheel E, shaft D, and pulleys F and G, and from the pulley F, by the bands o, o, to the augers the pulley G, giving motion at the same time to the shaft U, and the eccentric T, giving the reciprocating motion to the auger carriage R.

It might have been before observed that the machine represented is intended for operating on the several parts of one pair of blinds, consequently four (4) stiles, and (2) rods are operated on at once, requiring four (4) augers and two (2) pairs of prickers 31, 31.

Every time the auger carriage moves forward each auger bores a mortise in one stile, and each pair of prickers prick one rod for the wires; the sliding bar of carriage O, being stationary until the auger carriage has moved back far enough to draw out the augers at which time the sloping side of the recess in the side of the said carriage operating on the bearing screw 1, of the lever s, causes its pawl 2, to operate on the ratchet d, and move the sliding bar or carriage O, in the direction of the arrow 4, carrying the stiles and rods just far enough to bore the next mortises, and prick the next wire holes. As the next forward motion of the auger carriage begins, the spring 3, is allowed to operate on the lever s, and moves the pawl over one tooth of the ratchet ready for giving another motion to O; and so the operation continues, every forward movement of the auger carriage boring a mortise in each stile and pricking a pair of wire holes in each rod, and every backward motion moving the sliding bar or carriage O, a proper distance to make the next mortises and wire holes. It will be seen that the distance between the mortises in the stiles is governed by the length of the teeth of the ratchet so that in order to bore mortises at various distances apart two or more ratchets must be provided for each machine. It will be seen also that as the stiles and rods move the same distance the mortises and wire holes must be at equal distances apart.

While the foregoing parts of the operation are proceeding, the shaft J, is receiving rotary motion through the wheels H, I, and transmitting it through its pulleys L, M, to the tenon cutter shafts, cutter blocks, and cutters; the shaft y, is also receiving rotary motion through the pulleys K, z, and band 6; and its crank x, is communicating a reciprocatory motion to the slat table X, Y, Y$^5$; and the pin 28, under the table operating within the slot in the rod 27, is vibrating the lever 25, and the slat feeder and prickers. Each motion of the slat feeder 23, at the same time that its prickers 29, 29, prick the wire holes in one of the slats, pushes the lowest slat in the box through the hole v, to the table—or if the table is too far from the box the succeeding slats as they are pushed out will bring the slat to the table.

The parts are so arranged that the slat arrives at its place on the table and is caught by the dogs 9, and 10, just as it is commencing its movement toward the cutter block 21; and it is carried under the pressure roller 19, to the said cutter block, where its tenon or pivot is cut, the dog 9, being in the meantime released by coming in contact with the catch 33, when the one tenon or pivot is cut the table commences moving in the opposite direction, and the dog 9, is brought by the spring 11, into operation again, carrying the slat under the opposite pressure roller 19, to the cutter block 22, where the other tenon is cut, the dog 10, being in the meantime released by the catch 33.—this is shown in Fig. 2, the table being supposed to have nearly arrived at its extreme right hand position. Just as the table reaches the end of its movement in the direction last named, the tipper 13, passing over the bar 4, is thrown up suddenly and the slat thrown off the table, to the inclined chute 15, down which it slides to the floor or to any receptacle which may be provided for it. As soon as one slat is thrown off the table another is deposited on it by the feeder, and the operation is repeated on each consecutively.

If the relative speed of all the parts of the machine is properly regulated, all the parts of a pair of blinds may be inserted at once and commenced and finished at the same time, this however is immaterial as the speeds of all the parts may be such as are thought desirable, each operation, whether the mortising of the stiles and pricking of the rods, or the tenoning and pricking of the slats may, if desired be performed separately and contrivances are furnished for throwing either part of the machinery out of gear; these contrivances are not described as they are such as are common in all machinery.

Having described the nature, construction and operation of my invention I will proceed to state what I claim and desire to secure by Letters Patent—

1. I claim hanging the auger shafts in swinging arms or gates S, S, of different lengths hung on centers m, m, said centers being in line, so that by moving the said swinging arms or gates nearer to or farther from a position at right angles to the line in which the centers are placed, the distance between the said auger shafts taken in lines parallel to the line of centers m, m, will be increased or decreased, and thereby be adjusted to different widths of slats lying upon each other as herein substantially set forth.

2. I claim, the combination of the sliding bar or carriage O, carrying the stiles and rods, with the reciprocating carriage R, carrying the mortising augers, and wire hole prickers, in the manner substantially as described for the purpose of boring the mortises in the slats and pricking the wire holes in the rods and insuring the distances between the mortises and points of attachment of the slats being precisely the same throughout.

3. I claim the reciprocating slat table, or bed made in three parts X, Y, Y$^5$, the two end parts of which are adjustable to the middle part, in combination substantially in the manner described with the adjustable cutter heads Z, Z, to wit, the end parts Y, Y$^5$, of the table or bed and the cutter heads being adjustable relatively to each other for the purpose of tenoning or turning down the pivots on both ends of slats of various lengths.

4. I claim pricking the wire holes in the slats and feeding them at proper intervals from the box in which they are contained to the bed or table upon which they are tenoned by means of a vibrating feeder 23, deriving its motion from the bed or table carrying the slats, the said feeder being provided with suitable horns 24, 24, or their equivalents, and prickers 29, 29 for the purpose of entering the box and pricking and pushing out the slats one after the other in succession.

DANIEL H. THOMPSON.

Witnesses:
 Asa L. French,
 Amos C. Morse.